US012441119B2

(12) United States Patent
Ojima et al.

(10) Patent No.: US 12,441,119 B2
(45) Date of Patent: Oct. 14, 2025

(54) LIQUID CARTRIDGE AND METHOD FOR MANUFACTURING THE SAME

(71) Applicant: CANON KABUSHIKI KAISHA, Tokyo (JP)

(72) Inventors: Masatomo Ojima, Saitama (JP); Tomohisa Atsuta, Tokyo (JP); Hiroaki Kusano, Tokyo (JP); Yusuke Hashimoto, Kanagawa (JP); Junichiro Iri, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 204 days.

(21) Appl. No.: 18/184,598

(22) Filed: Mar. 15, 2023

(65) Prior Publication Data

US 2023/0330997 A1 Oct. 19, 2023

(30) Foreign Application Priority Data

Apr. 15, 2022 (JP) ................................. 2022-067564

(51) Int. Cl.
*B41J 2/175* (2006.01)

(52) U.S. Cl.
CPC ....... *B41J 2/17553* (2013.01); *B41J 2/17513* (2013.01); *B41J 2/1752* (2013.01); *B41J 2/17523* (2013.01); *B41J 2/17559* (2013.01)

(58) Field of Classification Search
CPC ......................... B41J 2/17553; B41J 2/17559; B41J 2/17513; B41J 2/1752; B41J 2/17523
See application file for complete search history.

(56) References Cited

U.S. PATENT DOCUMENTS

2002/0118262 A1* 8/2002 Seino .................. B41J 2/17553 347/86
2003/0067519 A1* 4/2003 Hayashi ............... B41J 2/17523 347/85

FOREIGN PATENT DOCUMENTS

JP H03136866 A 6/1991
JP H06191046 A * 7/1994 .............. B41J 2/175
JP H07017052 A 1/1995
JP 2001063098 A 3/2001
JP 2002046328 A 2/2002
JP 2010131335 A * 6/2010 ............... A62C 3/06

* cited by examiner

*Primary Examiner* — Yaovi M Ameh
(74) *Attorney, Agent, or Firm* — Canon U.S.A., Inc. IP Division

(57) ABSTRACT

A liquid cartridge includes a liquid container configured to store a liquid, a lid part configured to cover the liquid container, a liquid holding member stored in the liquid container and configured to hold the liquid, and a projection member connected to the liquid holding member, wherein the liquid holding member has a first surface facing the lid part, wherein the lid part includes an atmosphere communication path that communicates inside and outside of the liquid container, wherein the atmosphere communication path includes an opening that is open to the inside of the liquid container, and wherein the projection member projects from the first surface toward the lid part, and surrounds at least a portion of the opening as viewed from a vertical direction orthogonal to the first surface in which the lid part covers the liquid container.

12 Claims, 9 Drawing Sheets

LIQUID CARTRIDGE AND METHOD FOR MANUFACTURING THE SAME

BACKGROUND

Field of the Disclosure

The present disclosure relates to a liquid cartridge and a manufacturing method of the same.

Description of the Related Art

As a liquid cartridge that stores ink and is attached to an inkjet recording apparatus, there is known a liquid cartridge that includes a negative pressure generation unit that generates a negative pressure inside the liquid cartridge. Japanese Patent Application Laid-Open No. 6-191046 discusses a liquid cartridge that includes a liquid holding member that is made of a porous body as a negative pressure generation unit. The liquid cartridge discussed in Japanese Patent Application Laid-Open No. 6-191046 includes an atmosphere communication path that communicates the inside and the outside of the liquid cartridge to prevent an excessive rise in the negative pressure inside the liquid cartridge. There is provided a space portion between the liquid holding member and the upper lid of the liquid cartridge.

Under a reduced pressure or at a high temperature outside the liquid cartridge, a portion of ink may leak out from the liquid holding member and there may be little ink contained in the liquid holding member (hereinafter, such a liquid will be called free liquid). Most of the free liquid remains in the space portion, but a portion of the free liquid may intrude into the atmosphere communication path, thereby blocking the atmosphere communication path. Accordingly, the liquid cartridge may become hermetically sealed so that the liquid is no longer stably supplied to a liquid discharge apparatus, which results in the deterioration of the recording quality of the liquid discharge apparatus. This issue also applies to liquid cartridges storing a liquid other than ink.

SUMMARY

Aspects of the present disclosure provide a liquid cartridge that is unlikely to cause a blockage in an atmosphere communication path.

According to an aspect of the present disclosure, a liquid cartridge includes a liquid container configured to store a liquid, a lid part configured to cover the liquid container, a liquid holding member stored in the liquid container and configured to hold the liquid, and a projection member connected to the liquid holding member, wherein the liquid holding member has a first surface facing the lid part, wherein the lid part includes an atmosphere communication path that communicates inside and outside of the liquid container, wherein the atmosphere communication path includes an opening that is open to the inside of the liquid container, and wherein the projection member projects from the first surface toward the lid part, and surrounds at least a portion of the opening as viewed from a vertical direction orthogonal to the first surface in which the lid part covers the liquid container.

Further features of the present disclosure will become apparent from the following description of embodiments with reference to the attached drawings.

BRIEF DESCRIPTION OF THE DRAWINGS

FIG. 1A is a perspective view of the liquid cartridge seen from the side of a liquid discharge unit, FIG. 1B is a perspective view of the liquid cartridge seen from the side of a lid part of the liquid cartridge, FIG. 1C is an exploded perspective view illustrating a liquid container, a recording element substrate, and an electrical wiring member, and FIG. 1D is an exploded perspective view illustrating the liquid container, a liquid holding member, and the lid part.

FIG. 4A illustrates a state of occurrence of free liquid.

FIG. 5A schematically illustrates a step of aligning the lid part with the liquid container, FIG. 5B schematically illustrates a step of lowering the lid part and pressing the lid part against the liquid container, and FIG. 5C schematically illustrates a step of releasing the lid part from a jig and raising the jig.

FIG. 6A is a plan view of the liquid holding member with the projection member, and FIG. 6B is a cross-sectional view taken along line C-C illustrated in FIG. 6A.

FIG. 7A is a partial enlarged view of an atmosphere communication path and a projection member of the liquid cartridge according to the secondary embodiment and their vicinity, and FIG. 7B is a plan view of the projection member and its vicinity.

FIG. 9A is a partial enlarged view of an atmosphere communication path and a projection member of the liquid cartridge according to the third embodiment and their vicinity, and FIG. 9B is a plan view of the projection member and its vicinity.

DESCRIPTION OF THE EMBODIMENTS

Figure 1A:
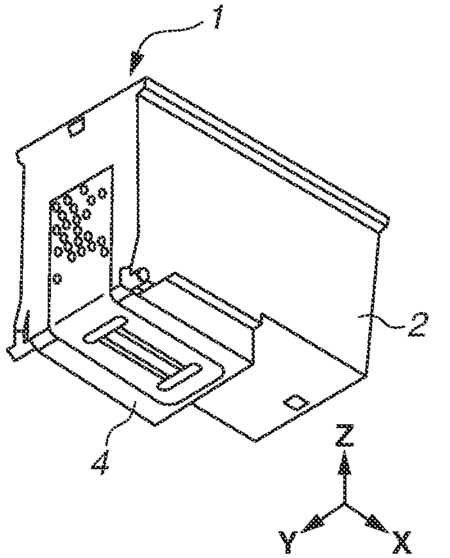
FIGS. 1A to 1D are diagrams schematically illustrating a configuration of a liquid cartridge according to a first embodiment.
Figure 1B:
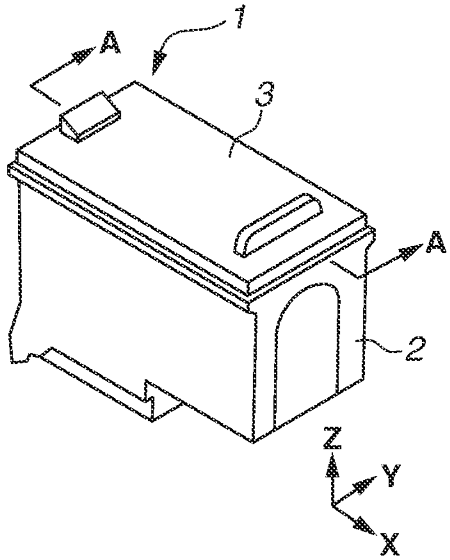
Figure 1C:
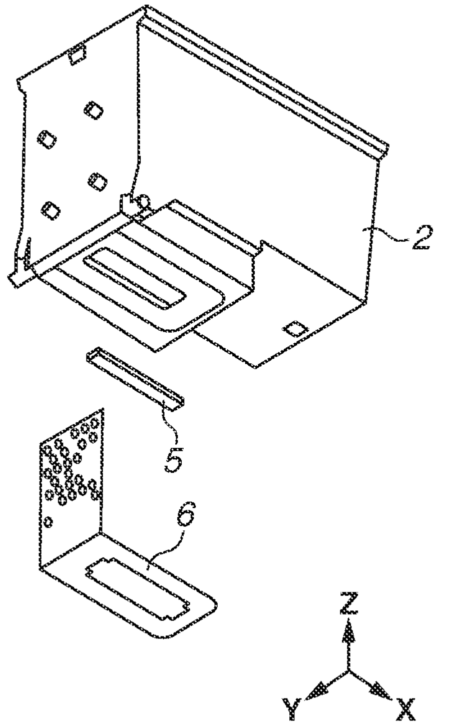
Figure 1D:
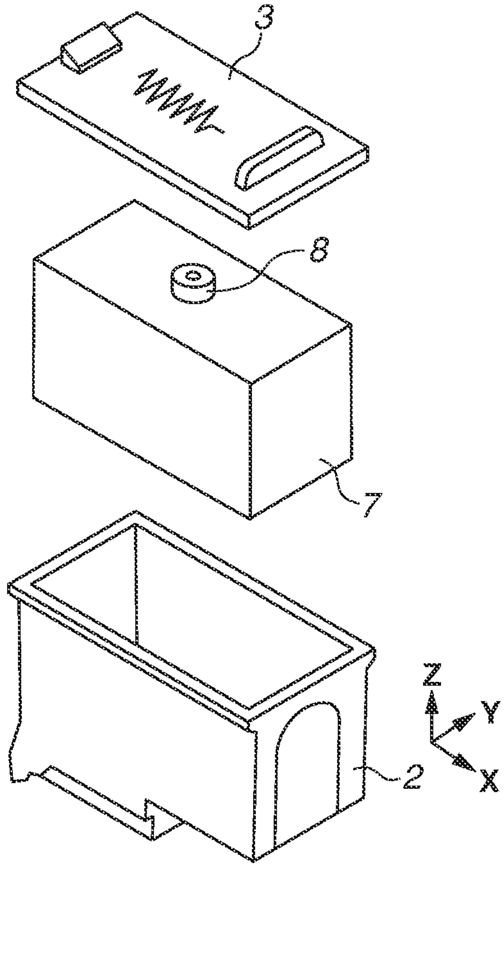
Figure 2:
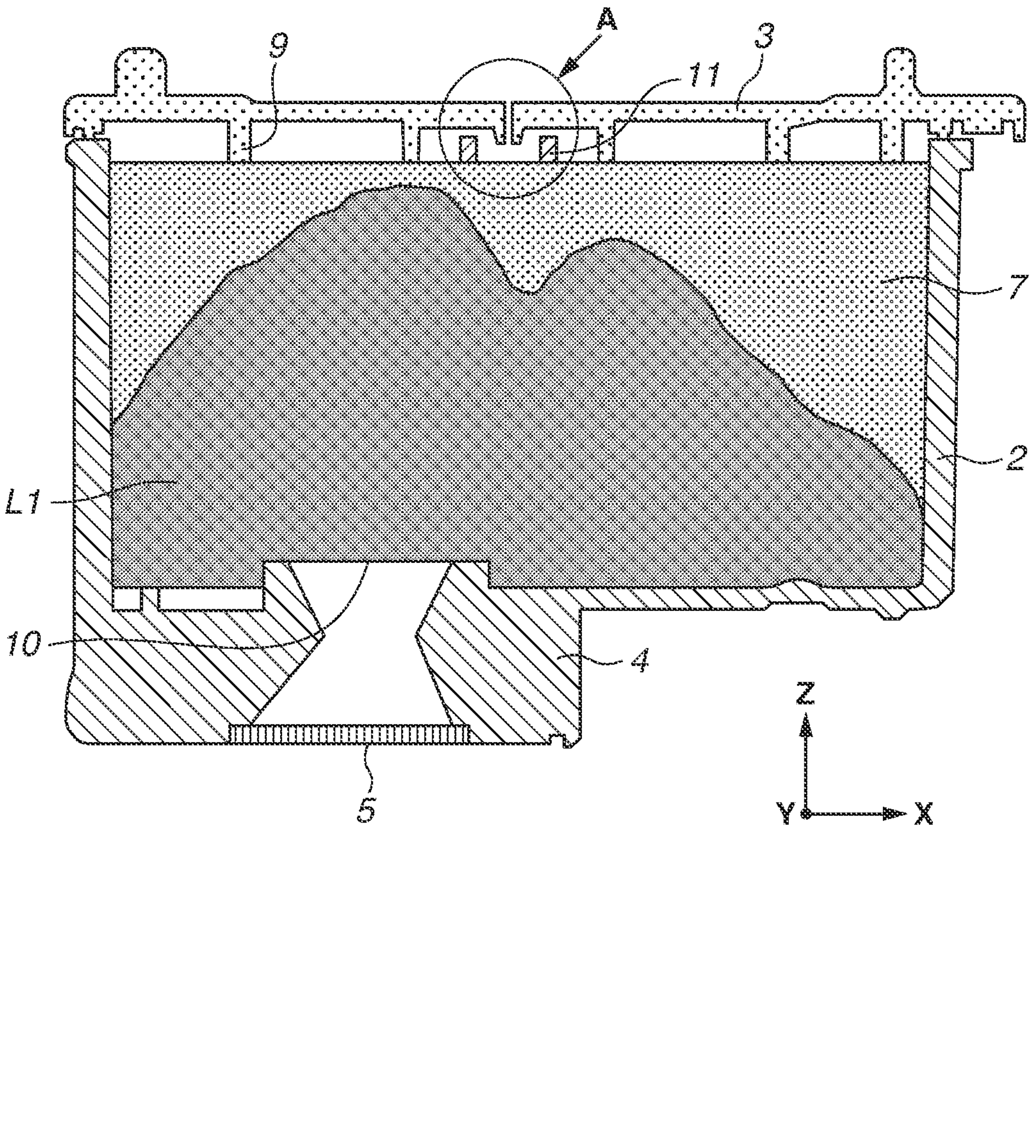
FIG. 2 is a lateral cross-sectional view of the liquid cartridge illustrated in FIG. 1.
Figure 3A:
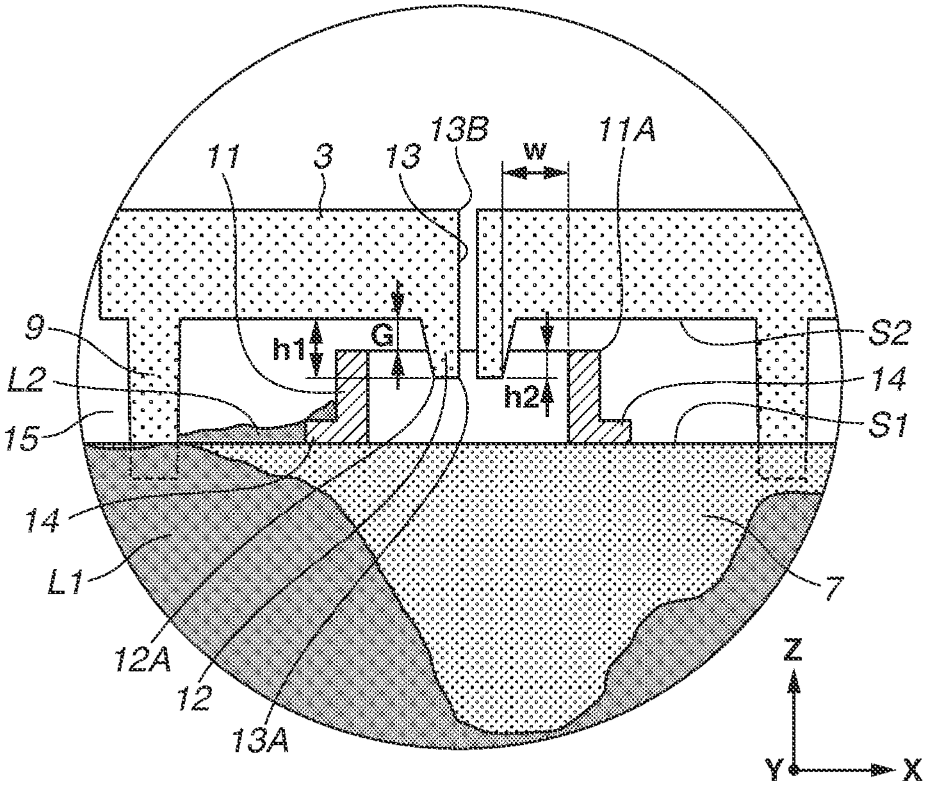
FIG. 3A is an enlarged view of a part A in FIG. 2.
Figure 3B:
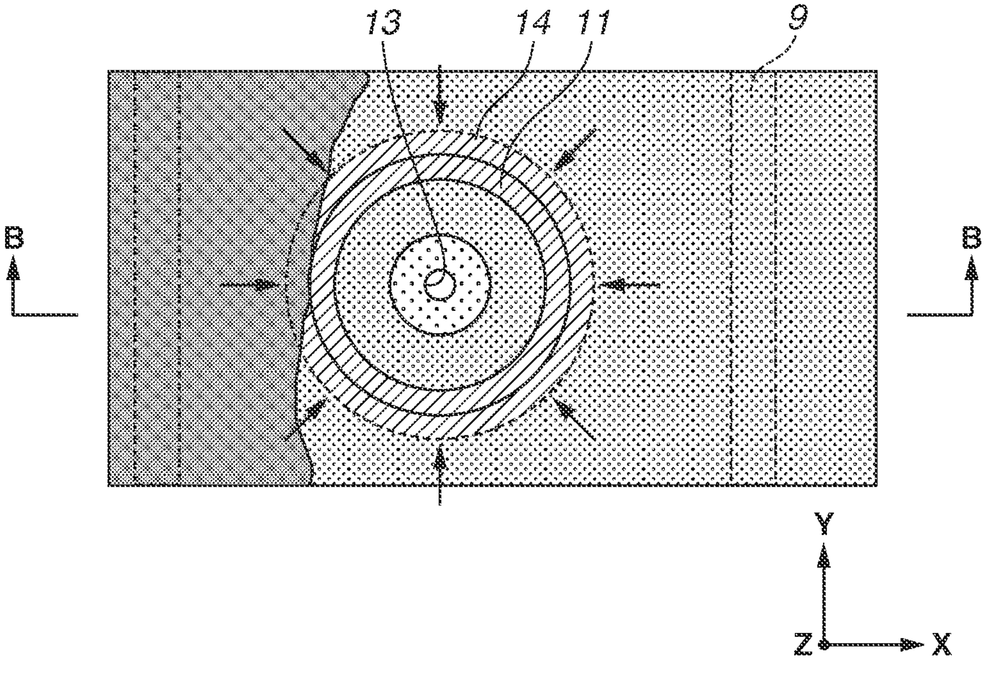
FIG. 3B is a plan view of a projection member and its vicinity.

Hereinafter, some embodiments of the present disclosure will be described. FIG. 1A is a perspective view of a liquid cartridge 1 according to a first embodiment when seen from the side of a liquid discharge unit 4 and FIG. 1B is a perspective view of the liquid cartridge 1 when seen from the side of a lid part 3. FIG. 1C is an exploded perspective view illustrating a liquid container 2, a recording element substrate 5, and an electrical wiring member 6, and FIG. 1D is an exploded perspective view illustrating the liquid container 2, a liquid holding member 7, and the lid part 3. FIG. 2 is a lateral cross-sectional view of the liquid cartridge 1 taken along line A-A illustrated in FIG. 1B. FIG. 3A is an enlarged view of a part A in FIG. 2 (cross-sectional view taken along line B-B in FIG. 3B), and FIG. 3B is a plan view of a projection member 11 and its vicinity. The following description is provided with reference to FIGS. 1A to 3B as appropriate. The direction in which the lid part 3 covers the liquid container 2 will be referred to as Z direction. The Z direction substantially coincides with the vertical direction. The Z direction coincides with a direction orthogonal to a first surface S1 of the liquid holding member 7 when the liquid cartridge 1 is attached to the main body of a liquid discharge apparatus. The long-side direction of the liquid holding member 7 will be referred to as X direction, and the short-side direction of the liquid holding member 7 will be referred to as Y direction. The X direction coincides with the direction of vibration generated at the time of vibration-welding of the lid part 3 to the liquid holding member 7. The X direction, the Y direction, and the Z direction are orthogonal to one another. In the following description, the terms "upper side" and "lower side" are defined in a state in which the liquid cartridge 1 is attached to the main body of the liquid discharge apparatus. The liquid cartridge 1 in which the liquid has run out is replaced with a new liquid cartridge 1. The liquid cartridge 1 is integrated with the recording element substrate 5 but may be separated from the recording element substrate 5. The liquid cartridge 1 may be a filling type liquid cartridge. In the following embodiments, the liquid refers to ink. However, the liquid is not limited to ink but may be any liquid that is dischargeable from the liquid discharge apparatus.

Overall Configuration

The liquid cartridge 1 includes the liquid container 2 that contains a liquid, the lid part 3 that is provided on the liquid container 2 to cover the liquid container 2, and the liquid discharge unit 4 that is provided under the liquid container 2 on the side opposite to the lid part 3. As viewed from the Z direction, the liquid discharge unit 4 is provided at a position eccentric to the center of the liquid container 2. The liquid cartridge 1 is mounted on a movable carriage (not illustrated) and performs a recording operation while moving. The liquid container 2 and the lid part 3 are manufactured by injection-molding using a resin. The internal space of the liquid container 2 is substantially in the shape of a rectangular parallelepiped, and has an opening that faces the lid part 3. The liquid container 2 stores a liquid holding member 7 holding a liquid.

The liquid discharge unit 4 includes a recording element substrate 5. The recording element substrate 5 includes an energy generation element (not illustrated) that applies discharging energy to the liquid. The energy generation element includes an electro-thermal converter (heater). However, the energy generation element may be any kind of element such as a piezoelectric element as long as the energy generation element can apply discharging energy to the liquid.

The liquid stored in the liquid container 2 is supplied to the liquid discharge unit 4 through a liquid supply port 10 at the lower part of the liquid container 2, and is discharged from the energy generation element of the recording element substrate 5 onto a recording medium. An electrical wiring member 6 is bonded to the liquid container 2. The electrical wiring member 6 includes a conductor (not illustrated) for sending electric power or control signals to the recording element substrate 5 and is electrically connected to the recording element substrate 5.

Liquid Holding Member 7

The liquid holding member 7 is arranged in the internal space of the liquid container 2 to absorb and hold a liquid L1 under a negative pressure. The liquid holding member 7 is made of a porous body. The liquid holding member 7 is substantially in the shape of a rectangular parallelepiped, and occupies most of the internal space of the liquid container 2. The liquid holding member 7 has a first surface S1 that faces the lid part 3 and is almost planar.

Lid Part 3

The lid part 3 is substantially in the shape of a flat plate. The lid part 3 has a second surface S2 that faces the liquid holding member 7 and is almost planar. The lid part 3 has a protrusion part 12 that protrudes from the second surface S2 toward the liquid holding member 7. The protrusion part 12 has the shape of a truncated cone that is decreased in cross-section area toward a leading end portion 12A. The protrusion part 12 is provided with an atmosphere communication path 13 that is concentric with the protrusion part 12 and communicates the inside and the outside of the liquid container 2. The atmosphere communication path 13 has a first opening 13A that is open to the inside of the liquid container 2 and a second opening 13B that is open to the atmosphere. The first opening 13A of the atmosphere communication path 13 is separated from the first surface S1 of the liquid holding member 7. A space portion 15 filled with air is formed between the first surface S1 of the liquid holding member 7 and the second surface S2 of the lid part 3. The lid part 3 has a plurality of ribs 9 that protrudes from the second surface S2 to abut or press the liquid holding member 7. Accordingly, the liquid holding member 7 is stably held inside the liquid container 2. The ribs 9 each have a shape combined by lines extending in at least two directions, such as T shape, V shape, or L shape, as viewed from the Z direction.

Projection Member 11

The liquid cartridge 1 includes the projection member 11 that is connected to the liquid holding member 7. As viewed from the Z direction, the projection member 11 is located in almost the center of the liquid holding member 7, and is at a position different from the liquid supply port 10. The projection member 11 is fixed to the liquid holding member 7 and protrudes upward in the Z direction from the first surface S1 toward the lid part 3. The projection member 11 is made of a porous body, as with the liquid holding member 7.

It is desirable that the liquid holding member 7 has a melting point similar to the melting point of the projection member 11 (a melting point within a predetermined range). More desirably, the projection member 11 is made of the same material as the liquid holding member 7. A ring-shaped welding part 14 is provided on the outer peripheral portion of projection member 11, and the ring-shaped welding part 14 is in contact with the liquid holding member 7 to weld the projection member 11 to the liquid holding member 7. The projection member 11 may be molded integrally with the liquid holding member 7. However, in terms of costs including manufacturing and logistic costs, the projection member 11 is desirably a member separate from the liquid holding member 7. The projection member 11 is a circular tube that is concentric to the first opening 13A and the atmosphere communication path 13. That is, as viewed from the Z direction, the projection member 11 is in the shape of a circular ring that surrounds the entire periphery of the first opening 13A of the atmosphere communication path 13. Alternatively, the projection member 11 may have a polygonal shape as viewed from the Z direction. As viewed from the Z direction, the distance between the projection member 11 and the first opening 13A of the atmosphere communication path 13 is shorter than the distance between each of the plurality of ribs 9 and the center of the first opening 13A.

That is, as viewed from the Z direction, the distance between any position in the projection member 11 and the center of the first opening 13A is shorter than the distance between a position of any rib 9 and the center of the first opening 13A. In the Z direction, a leading end portion 11A of the projection member 11 is located between the first surface S1 and the second surface S2 and is located between the second surface S2 and the leading end portion 12A of the protrusion part 12.

Figure 4A:
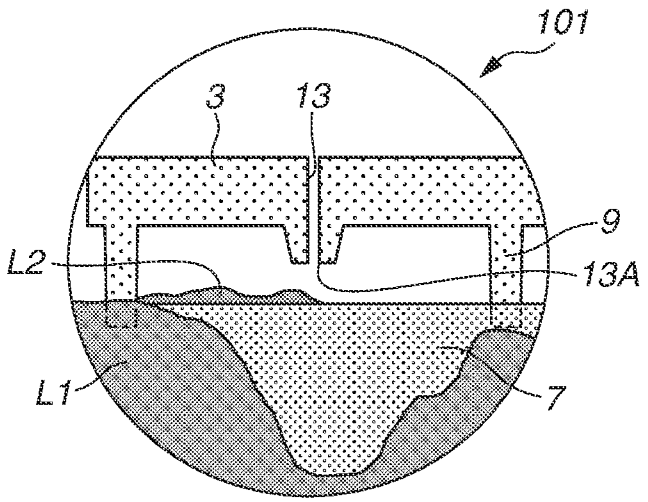
FIGS. 4A to AC are schematic diagrams illustrating dispersion of a liquid in a liquid cartridge according to a comparative example.
Figure 4B:
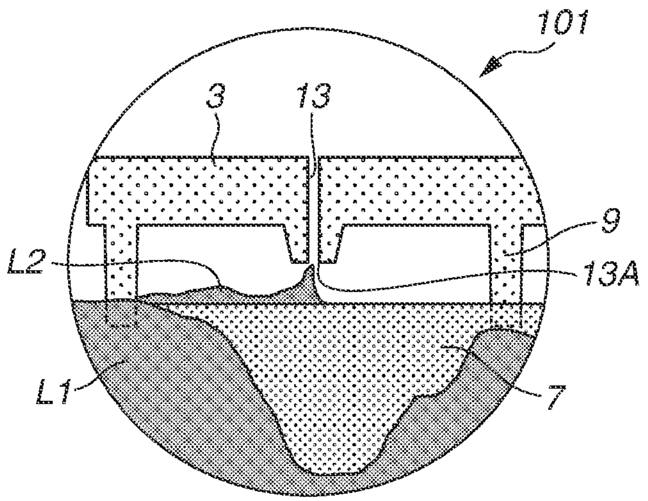
FIG. 4B illustrates a state with a possibility of a portion of the free liquid intruding into an atmosphere communication path.
Figure 4C:
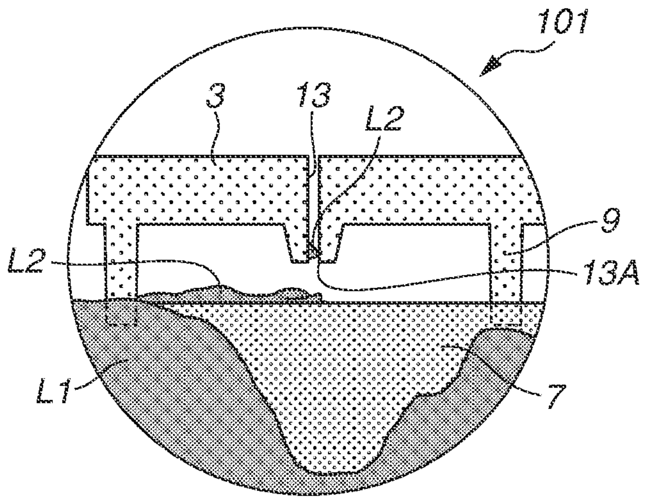
FIG. 4C illustrates a state in which the free liquid blocks the atmosphere communication path.

FIG. 4A to 4C are diagrams illustrating a problem with a liquid cartridge 101 according to a comparative example. The liquid cartridge 101 according to the comparative example has a configuration similar to that of the liquid cartridge 1 in the first embodiment except for absence of the projection member 11. When the lid part 3 is vibration-welded to the liquid container 2 as described below, the ribs 9 of the lid part 3 press the liquid holding member 7 so that the liquid holding member 7 may become deformed to generate a free liquid L2 as illustrated in FIG. 4A. If the internal pressure of the liquid container 2 fluctuates in this state due to a change in the external pressure, an air flow is generated toward the first opening 13A of the atmosphere communication path 13 as illustrated in FIG. 4B so that a portion of the free liquid L2 may intrude into the atmosphere communication path 13. There is also a possibility that the free liquid L2 may flow to a position immediately below the first opening 13A and may scatter due to vibration generated in the liquid cartridge 101 when the carriage moves. Then, the scattered free liquid L2 may intrude into the atmosphere communication path 13. As illustrated in FIG. 4C, the free liquid L2 having intruded into the atmosphere communication path 13 may block the atmosphere communication path 13 so that the internal space of the liquid container 2 is hermetically sealed. Accordingly, the liquid may not be stably supplied to the liquid discharge unit 4.

FIGS. 3A and 3B illustrate a state in which the projection member 11 captures the flowing free liquid L2. The projection member 11 prevents the free liquid L2 from intruding into the atmosphere communication path 13 so that communication through the atmosphere communication path 13 is likely to be secured. Accordingly, the liquid is stably supplied to the liquid discharge unit 4, and the high-quality recording is maintained. In particular, the leading end portion 11A of the projection member 11 is located between the second surface S2 and the leading end portion 12A of the protrusion part 12, which decreases the amount of the free liquid L2 that flows from the outside of the projection member 11 over the leading end portion 11A of the projection member 11, and intrudes inside the projection member 11. Therefore, it is possible to effectively prevent intrusion of the free liquid L2 into the atmosphere communication path 13. Since the liquid is unlikely to leak from the second opening 13B of the atmosphere communication path 13, the yield rate of liquid cartridges 1 can be improved in the manufacturing process, thereby achieving reduction in the cost of the liquid cartridge 1. In the present disclosure, the leading end portion 11A of the projection member 11 needs not necessarily be located between the second surface S2 and the leading end portion 12A of the protrusion part 12. In an extreme example, the protrusion part 12 may not be provided.

A distance h2 in the Z direction between the leading end portion 11A of the projection member 11 and the leading end portion 12A of the protrusion part 12 is desirably ⅖ or more and ⅘ or less of an entire length h1 of the protrusion part 12. For example, if the entire length h1 of the protrusion part 12 is 1.5 mm, the distance h2 is desirably 0.6 mm or more and 1.2 mm or less. Since $h2 \leq (4/5) \times h1$, a gap G is secured between the leading end portion 11A of the projection member 11 and the second surface S2, so that when the lid part 3 is vibration-welded, the projection member 11 is unlikely to come into contact with the second surface S2 of the lid part 3. This decreases a possibility that the lid part 3 presses the projection member 11 into the liquid holding member 7 to generate the free liquid L2 inside the projection member 11. In addition, this also decreases a possibility that the projection member 11 becomes separate from the first surface S1 of the liquid holding member 7 and is shifted in position due to the impact of vibration welding of the lid part 3. Although, as described above, the leading end portion 11A of the projection member 11 is located between the second surface S2 and the leading end portion 12A of the protrusion part 12 ($h2>0$), it is further desirable to satisfy $h2 \geq (2/5) \times h1$. This further decreases a possibility that the dispersed free liquid L2 flows over the leading end portion 11A of the projection member 11 and intrudes into the projection member 11, and thus it is possible to more effectively prevent intrusion of the free liquid L2 into the atmosphere communication path 13.

As viewed from the Z direction, the projection member 11 surrounds the entire periphery of the first opening 13A. Thus, as illustrated in FIG. 3B, the projection member 11 can capture and absorb the free liquid L2 even if the free liquid L2 collides with the projection member 11 from any direction. Since the projection member 11 is formed of a porous member, the projection member 11 efficiently absorbs and holds the dispersed free liquid L2. This further effectively prevents the free liquid L2 from flowing over the projection member 11 and intruding into the atmosphere communication path 13.

The inner periphery of the projection member 11 is separated by a predetermined distance w from the outer periphery of the leading end portion 12A of the protrusion part 12. The predetermined distance w is desirably 1.2 times or more longer than an amplitude with which the lid part 3 is vibration-welded to the liquid container 2, and is desirably equal to or shorter than the entire length h1 of the protrusion part 12. If the projection member 11 is separated excessively far from the first opening 13A, the projection member 11 is less likely to capture the dispersed free liquid L2. If the projection member 11 is too close to the first opening 13A, there arises a possibility that the protrusion part 12 comes into contact with the projection member 11 at the time of vibration-welding of the lid part 3, so that the projection member 11 is pressed into the liquid holding member 7 due to the impact of the contact and the free liquid L2 is generated inside the projection member 11. For example, if the X-direction amplitude at the time of vibration-welding is 0.8 mm and the entire length h1 of the protrusion part 12 is 1.5 mm, the distance w is desirably about 1.0 mm or more and 1.5 mm or less.

Manufacturing Method of Liquid Cartridge 1

Figure 5A:
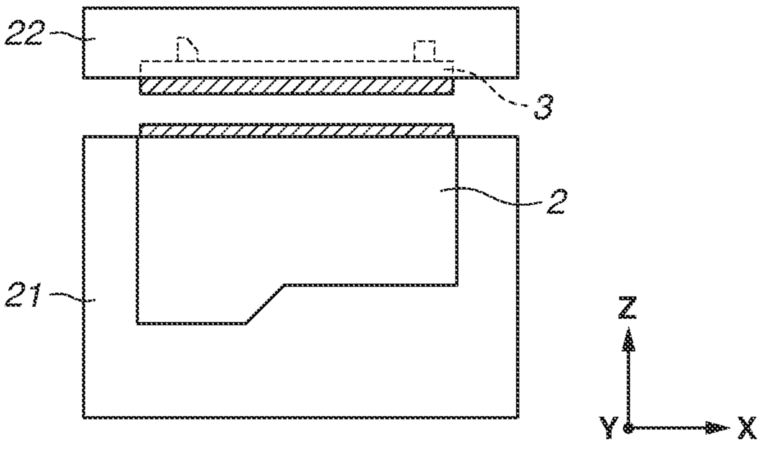
FIGS. 5A to 5C are schematic diagrams illustrating steps of welding the lid part to the liquid container in sequence.
Figure 5B:
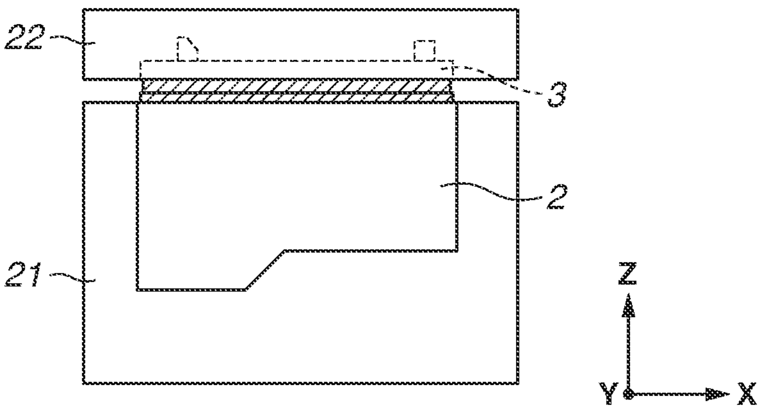
Figure 5C:
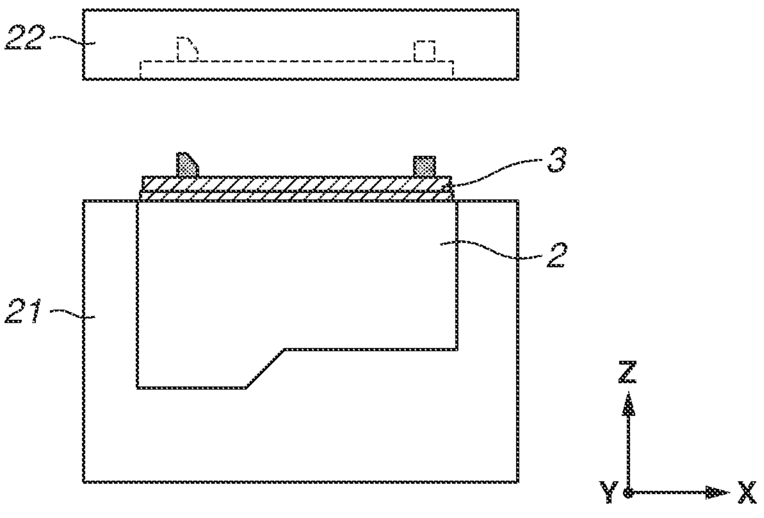

FIGS. 5A to 5C are schematic diagrams illustrating the process of welding the lid part 3 to the liquid container 2. The recording element substrate 5 and the electrical wiring member 6 illustrated in FIG. 1C are attached to the liquid container 2, and then the liquid holding member 7 is stored in the liquid container 2. Next, the projection member 11 is attached to the liquid holding member 7, the liquid container 2 is filled with the liquid, and the liquid holding member 7 is impregnated with the liquid to hold the liquid therein. After that, the lid part 3 is welded to the liquid container 2 filled with the liquid. Specifically, as illustrated in FIG. 5A, the lid part 3 held by a jig 22 is aligned with the liquid container 2 held by a jig 21, and the lid part 3 is lowered and pressed against the liquid container 2 as illustrated in FIG. 5B. In this state, the lid part 3 is vibrated in the X direction, and the lid part 3 and the liquid container 2 are welded together by their respective contact surfaces. After that, the lid part 3 is released from the jig 22 and the jig 22 is raised as illustrated in FIG. 5C.

Figure 6A:
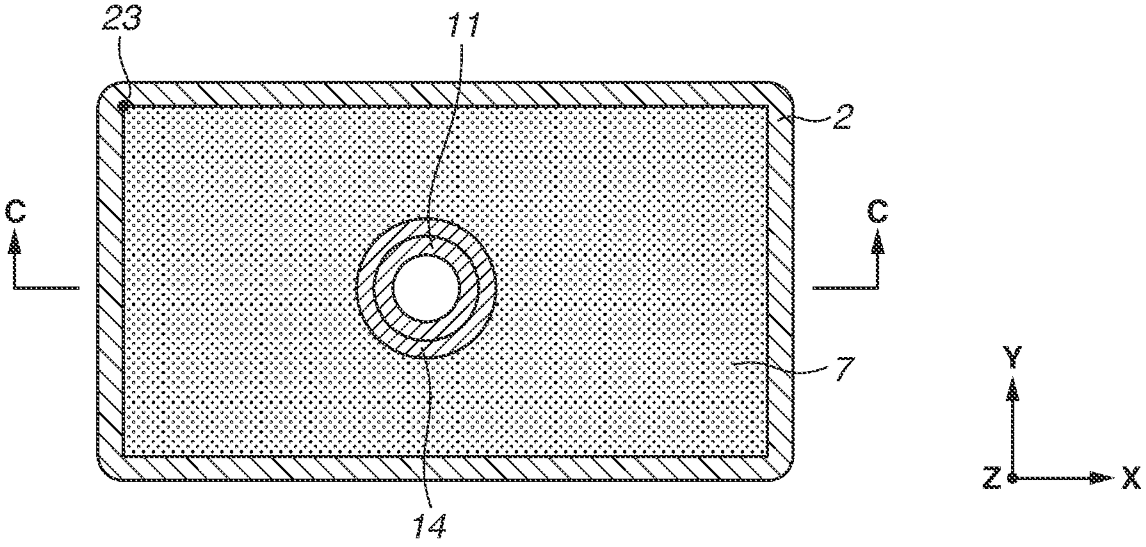
FIGS. 6A and 6B are schematic diagrams illustrating a step of welding the projection member to the liquid holding member.
Figure 6B:
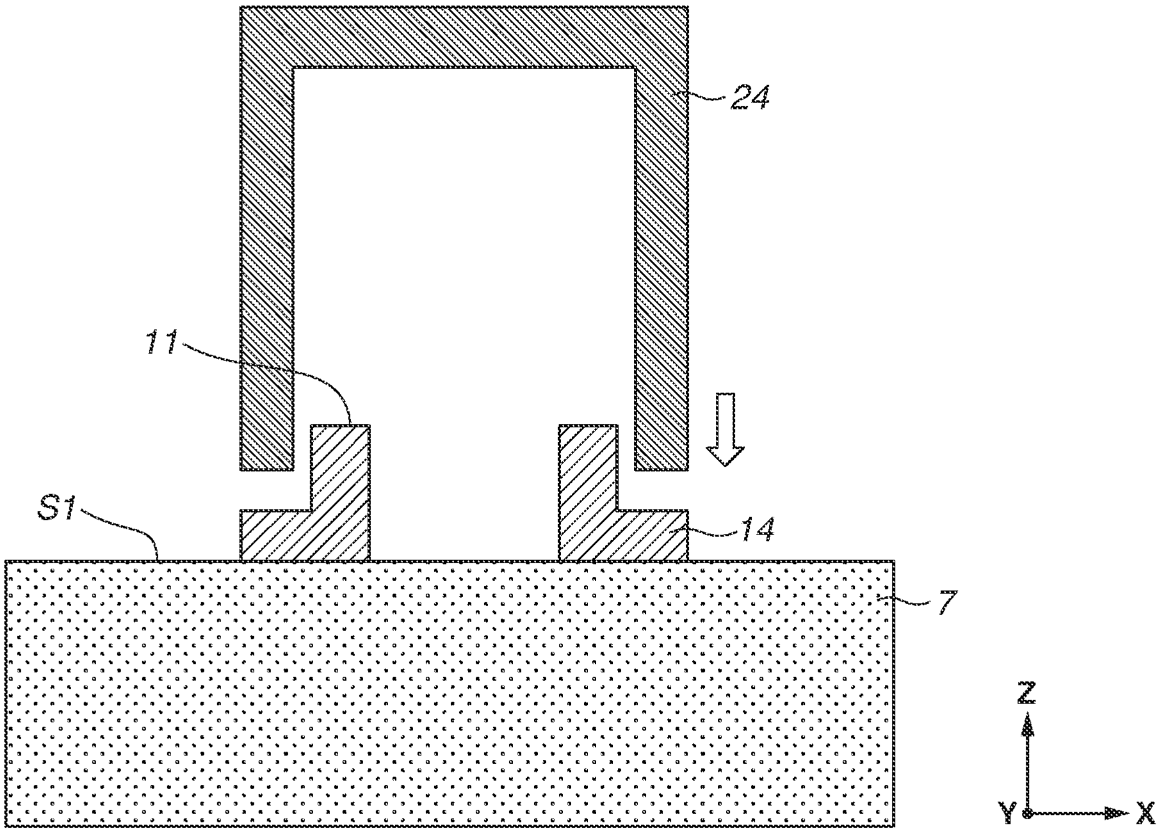

FIGS. 6A and 6B are schematic diagrams illustrating the process of welding the projection member 11 to the liquid holding member 7. FIG. 6A is a plan view of the liquid holding member 7 on which the projection member 11 is arranged, and FIG. 6B is a cross-sectional view taken along line C-C illustrated in FIG. 6A. The projection member 11 is accurately arranged on the first surface S1 of the liquid holding member 7 with respect to a predetermined reference position 23 in the liquid container 2. The projection member 11 is attached to the first surface S1 of the liquid holding member 7 so as to protrude upward (toward the lid part 3). Next, the welding part 14 of the projection member 11 is pressed and heated using a thermal welding horn 24 while the projection member 11 is held on the first surface S1. When the welding part 14 is heated by the thermal welding horn 24, the welding part 14 becomes melted. Accordingly, the first surface S1 of the liquid holding member 7 becomes melted, and then the projection member 11 is bonded to the liquid holding member 7. In particular, if the melting point of the projection member 11 is set to a melting point similar to that of the liquid holding member 7, the two members become melted at the same time, thereby enhancing the reliability of welding.

Figure 7A:
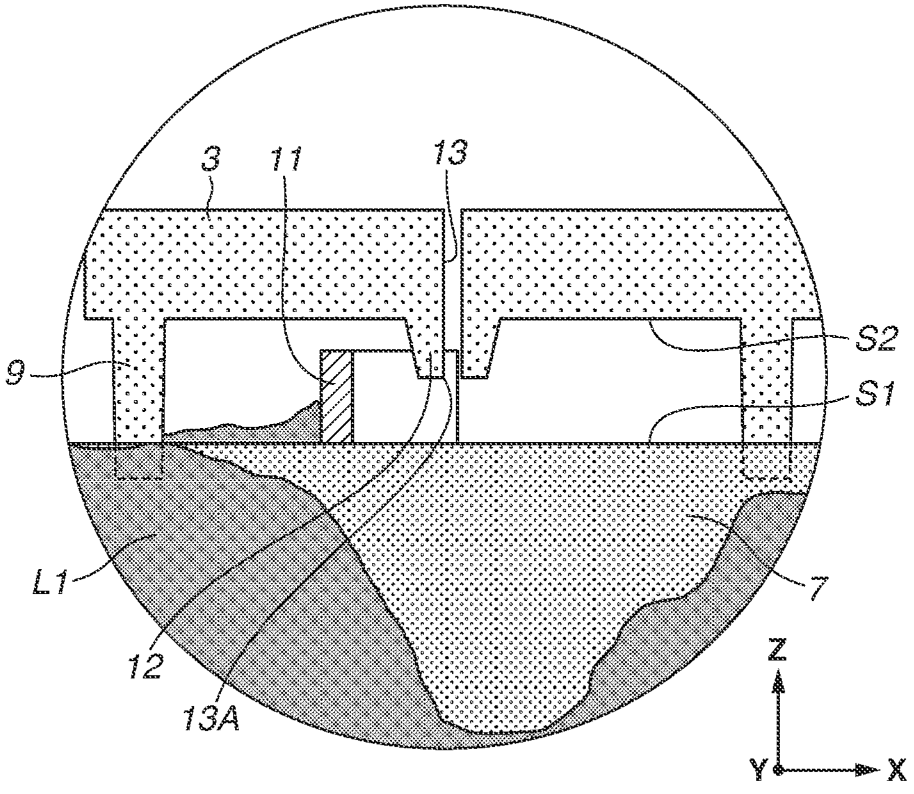
FIGS. 7A and 7B are schematic diagrams illustrating main components of a liquid cartridge according to a second embodiment.
Figure 7B:
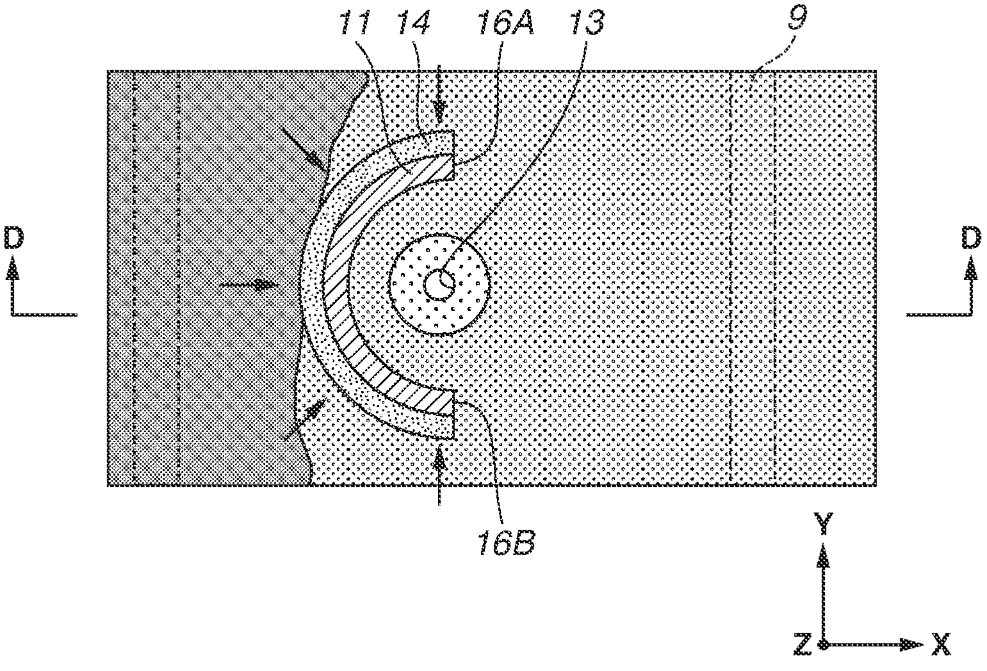

FIG. 7A is a partial enlarged view of a liquid cartridge 1 according to a secondary embodiment and FIG. 7B is a plan view of a projection member 11 and its vicinity, which correspond to FIGS. 3A and 3B, respectively. As viewed from the Z direction, the projection member 11 has an open shape with two end portions 16A and 16B and surrounds only a portion of a first opening 13A. The projection member 11 is a portion of a circular tube concentric to the first opening 13A, and the inner periphery of the projection member 11 is separated by a predetermined distance w from the outer periphery of a leading end portion 12A of a protrusion part 12 as in the first embodiment (see FIG. 3). The predetermined distance w is desirably 1.2 times longer than an amplitude at the time of vibration-welding of a lid part 3 to a liquid container 2 and is desirably equal to or shorter than the entire length of the protrusion part 12. As viewed from the Z direction, the projection member 11 is substantially in the shape of a semi-circle. Alternatively, the projection member 11 may be in the shape of a polygon. As in the first embodiment, as viewed from the Z direction, a liquid supply port 10 is eccentric to the center of the liquid container 2 and the first opening 13A of the atmosphere communication path 13 is located at a position different from the liquid supply port 10 (see FIG. 2). In order to stably supply the liquid from the liquid supply port 10 to a liquid discharge unit 4, a large amount of the liquid may be injected to the upper part of the liquid discharge unit 4 (the liquid supply port 10). In this case, the free liquid L2 is likely to occur on the side provided with the liquid discharge unit 4. In the present embodiment, if a part where the free liquid L2 is likely to occur can be predicted in advance, the projection member 11 is provided only between that part and the first opening 13A of the atmosphere communication path 13. The projection member 11 is desirably provided at least between the first opening 13A and the liquid discharge unit 4. According to the second embodiment, the use amount of material for the projection member 11 can be suppressed, thereby producing an effect of reducing cost.

Figure 8A:
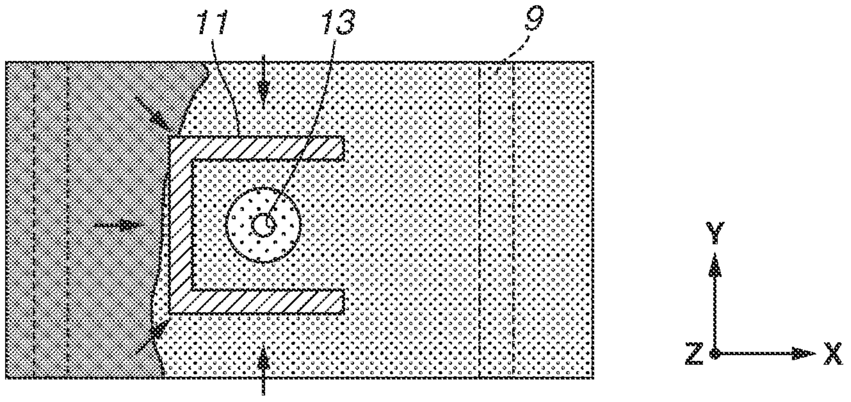
FIGS. 8A to 8D are cross-sectional views of main components of liquid cartridges according to various modification examples of the secondary embodiment.
Figure 8B:
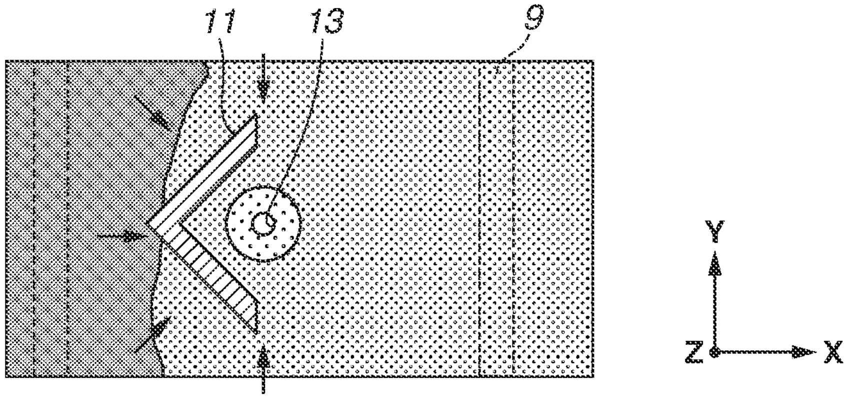
Figure 8C:
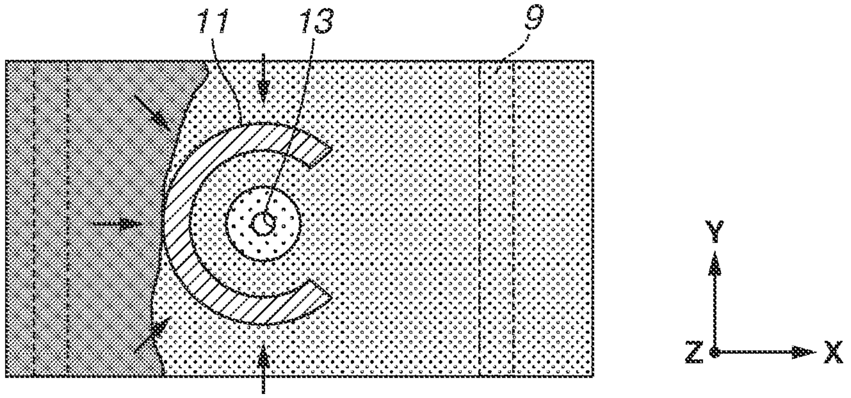

FIGS. 8A to 8D illustrate modification examples of the present embodiment. FIGS. 8A to 8D are plan views similar to FIG. 7B and do not illustrate the welding part 14. As viewed from the Z direction, the projection member 11 may have a shape formed of three rectangular sides as illustrated in FIG. 8A, or may have a V shape as illustrated in FIG. 8B. That is, the projection member 11 may have a shape formed of a combination of a plurality of straight lines. As viewed from the Z direction, the projection member 11 may have a C shape (an arc shape surrounding ½ or more and ¾ or less of the entire periphery of the first opening 13A of the atmosphere communication path 13) as illustrated in FIG. 8C. That is, the projection member 11 may have a shape formed of any one curved line.

Figure 8D:
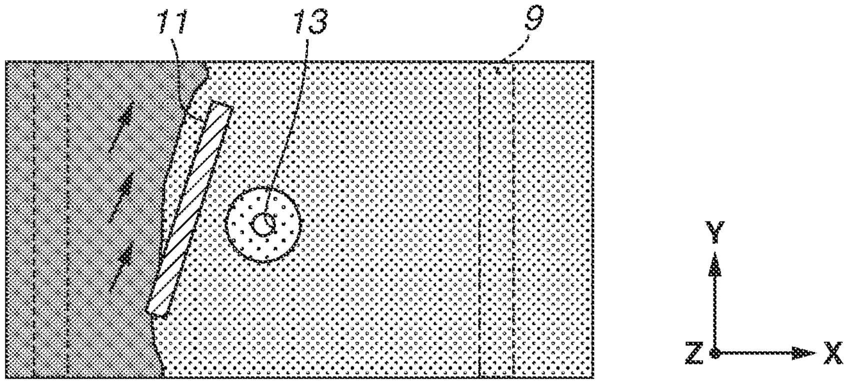

Although not illustrated, the projection member 11 may have a shape formed of a combination of at least one curved line and at least one straight line. In these modification examples, the projection member 11 is provided only between the part where the free liquid L2 is likely to occur and the first opening 13A of the atmosphere communication path 13. As illustrated in FIG. 8D, the projection member 11 may have a shape formed of one straight line. In this case as well, the projection member 11 is provided only between the part where the free liquid L2 is likely to occur and the first opening 13A of the atmosphere communication path 13, and is desirably arranged in particular in parallel to the flowing direction of the free liquid L2. According to these modification examples as well, the use amount of material for the projection member 11 can be suppressed, thereby producing an effect of reducing cost. As can be understood from the first and second embodiments, the projection member 11 surrounds at least a portion of the opening as viewed from the Z direction.

Figure 9A:
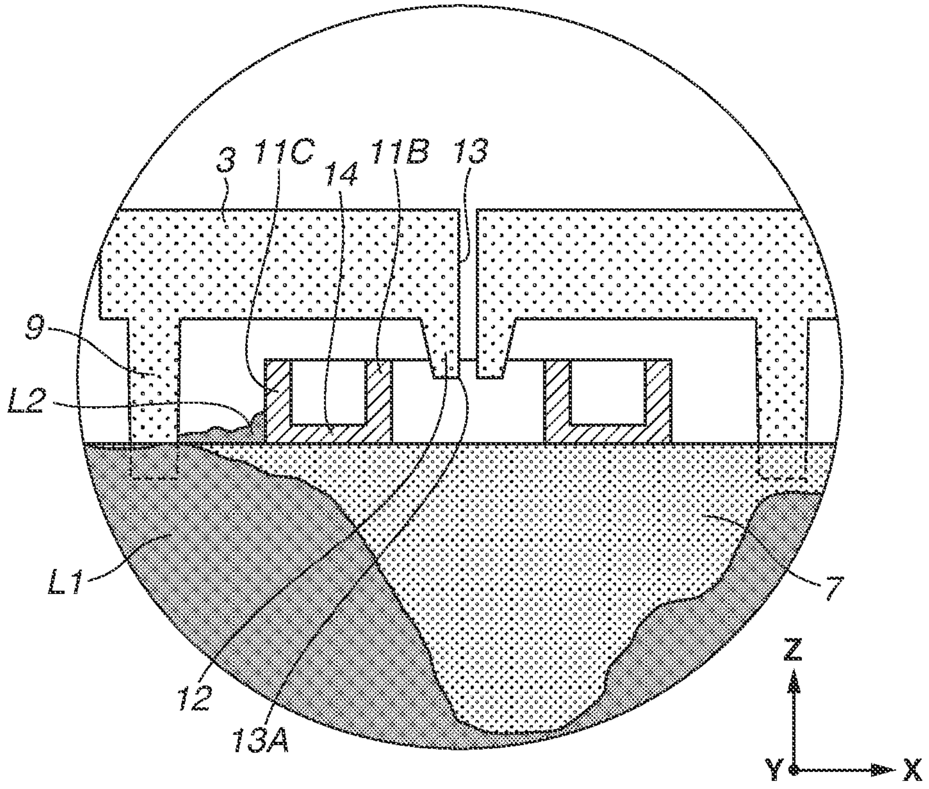
FIGS. 9A and 9B are schematic diagrams illustrating main components of a liquid cartridge according to a third embodiment.
Figure 9B:
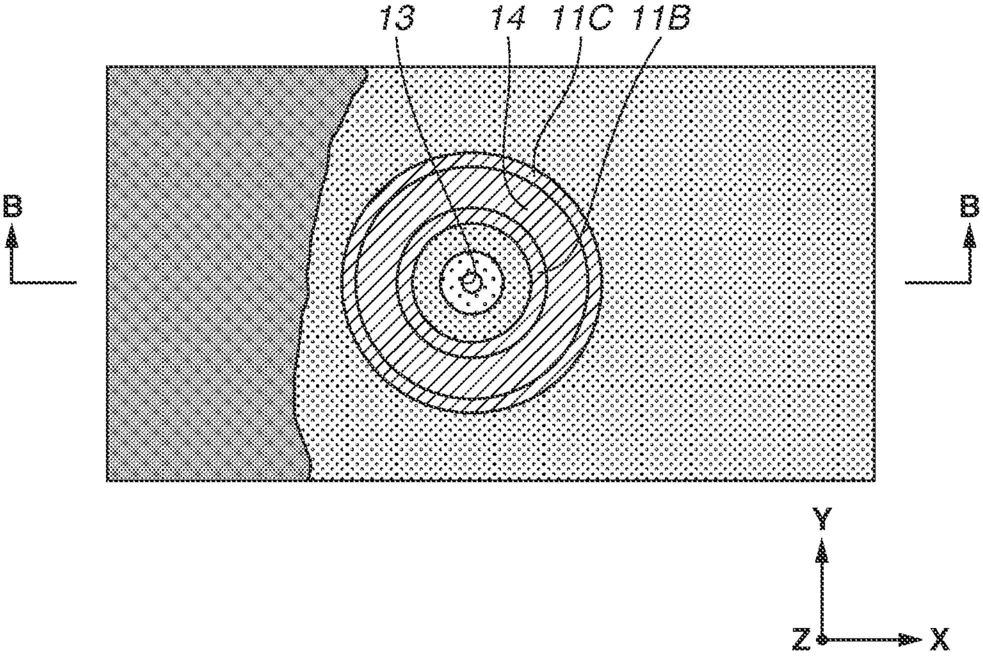

FIG. 9A is a partial enlarged view of a liquid cartridge 1 according to a third embodiment and FIG. 9B is a plan view of a projection member 11 and its vicinity, which correspond to FIGS. 3A and 3B, respectively. As viewed from the Z direction, a plurality of projection members 11C and 11B is concentrically provided around a first opening 13A. According to this configuration, even if a free liquid L2 flows over the outer projection member 11C and intrudes to the inner side of the outer projection member 11C, the inner projection member 11B blocks the free liquid L2 so that it is possible to further effectively prevent the free liquid L2 from intruding into an atmosphere communication path 13. A welding part 14 is located between the outer projection member 11C and the inner projection member 11B, and is integrated with the outer projection member 11C and the inner projection member 11B. Accordingly, the shapes of the projection members 11C and 11B can be stabilized and the projection members 11C and 11B can be attached to the liquid holding member 7 by one welding process.

According to the present disclosure, it is possible to provide a liquid cartridge that is unlikely to cause a blockage in an atmosphere communication path.

While the present disclosure has been described with reference to embodiments, it is to be understood that the disclosure is not limited to the disclosed embodiments. The scope of the following claims is to be accorded the broadest interpretation so as to encompass all such modifications and equivalent structures and functions.

This application claims the benefit of priority from Japanese Patent Application No. 2022-067564, filed Apr. 15, 2022, which is hereby incorporated by reference herein in its entirety.

What is claimed is:

1. A liquid cartridge comprising:

a liquid container configured to store a liquid;

a lid part configured to cover the liquid container;

a liquid holding member stored in the liquid container and configured to hold the liquid; and a projection member connected to the liquid holding member, wherein the liquid holding member has a first surface facing the lid part, wherein the lid part includes an atmosphere communication path that communicates inside and outside of the liquid container, wherein the atmosphere communication path includes an opening that is open to the inside of the liquid container, wherein the projection member projects from the first surface toward the lid part, and surrounds at least a portion of the opening as viewed from a vertical direction orthogonal to the first surface in which the lid part covers the liquid container, wherein the lid part has a second surface facing the liquid holding member, wherein a leading end portion of the projection member is located between the first surface and the second surface, wherein the lid part includes a protrusion part that includes the atmosphere communication path and protrudes from the second surface toward the liquid holding member, wherein the leading end portion of the projection member is located between the second surface and a leading end portion of the protrusion part, and wherein a distance between the leading end portion of the projection member and the leading end portion of the protrusion part in the vertical direction is ⅖ or more and ⅘ or less of a length of the protrusion part from the second surface to the leading end portion of the protrusion part in the vertical direction.

2. The liquid cartridge according to claim 1, wherein the lid part includes a plurality of ribs that protrudes from the second surface and comes into contact with the liquid holding member, and wherein a distance between the projection member and the opening is shorter than a distance between each of the plurality of ribs and the opening as viewed from the direction.

3. The liquid cartridge according to claim 1, wherein the projection member surrounds a periphery of the opening as viewed from the vertical direction.

4. The liquid cartridge according to claim 3, wherein the projection member is a circular tube concentric to the opening, wherein the lid part has a second surface facing the liquid holding member, wherein the lid part includes a protrusion part that protrudes from the second surface toward the liquid holding member, wherein an inner periphery of the projection member is separated by a predetermined distance from an outer periphery of a leading end portion of the protrusion part, and wherein the predetermined distance is 1.2 times greater than an amplitude at a time of vibration-welding of the lid part to the liquid container and is equal to or less than a length of the protrusion part from the second surface to the leading end portion of the protrusion part in the vertical direction.

5. The liquid cartridge according to claim 1, further comprising a liquid supply port that is provided on a surface of the liquid container opposite to the lid part, wherein the opening of the atmosphere communication path is located at a position different from the liquid supply port as viewed from the vertical direction, wherein the projection member is disposed between the opening of the atmosphere communication path and the liquid supply port as viewed from the vertical direction, and wherein the projection member includes two end portions and surrounds only a portion of a periphery of the opening as viewed from the direction.

6. The liquid cartridge according to claim 5, wherein the projection member is a portion of a circular tube concentric to the opening.

7. The liquid cartridge according to claim 6, wherein the lid part has a second surface facing the liquid holding member, wherein the lid part includes a protrusion part that protrudes from the second surface toward the liquid holding member, wherein an inner periphery of the projection member is separated by a predetermined distance from an outer periphery of a leading end portion of the protrusion part, and wherein the predetermined distance is 1.2 times longer than an amplitude at a time of vibration-welding of the lid part to the liquid container and is equal to or less than a length of the protrusion part from a second surface to the leading end portion of the protrusion part in the vertical direction.

8. The liquid cartridge according to claim 5, wherein the projection member has a shape formed of one curved line, a plurality of straight lines, or a combination of at least one curved line and at least one straight line.

9. The liquid cartridge according to claim 1, wherein the projection member includes a plurality of projection members, and wherein the plurality of the projection members is concentrically provided around the opening.

10. The liquid cartridge according to claim 1, wherein the liquid holding member and the projection member are each made of a porous body.

11. The liquid cartridge according to claim 10, wherein the liquid holding member and the projection member have melting point within a predetermined range.

12. The liquid cartridge according to claim 1, wherein the projection member is welded to the liquid holding member.

* * * * *